A. T. RILEY.
Car-Brakes.
No. 166,811. Patented Aug. 17, 1875.
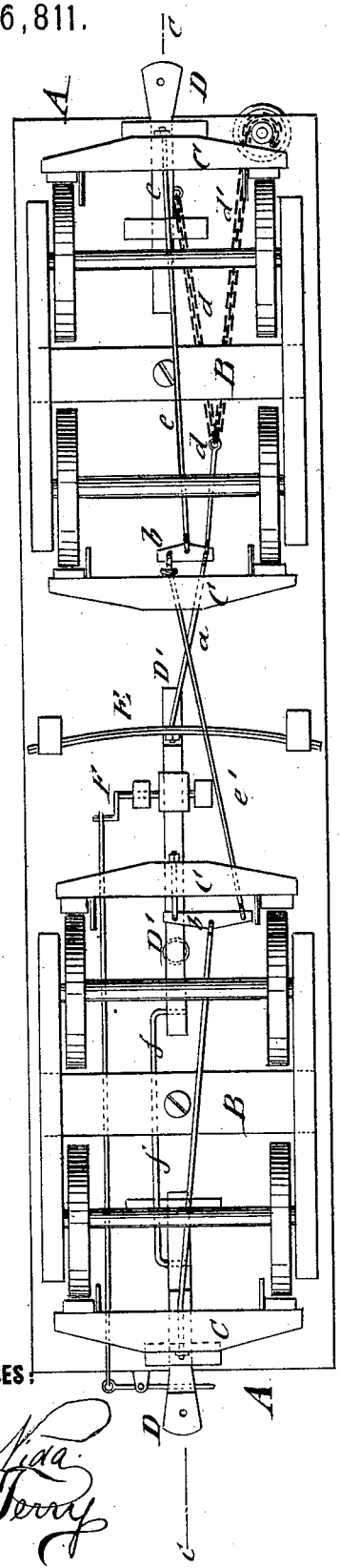
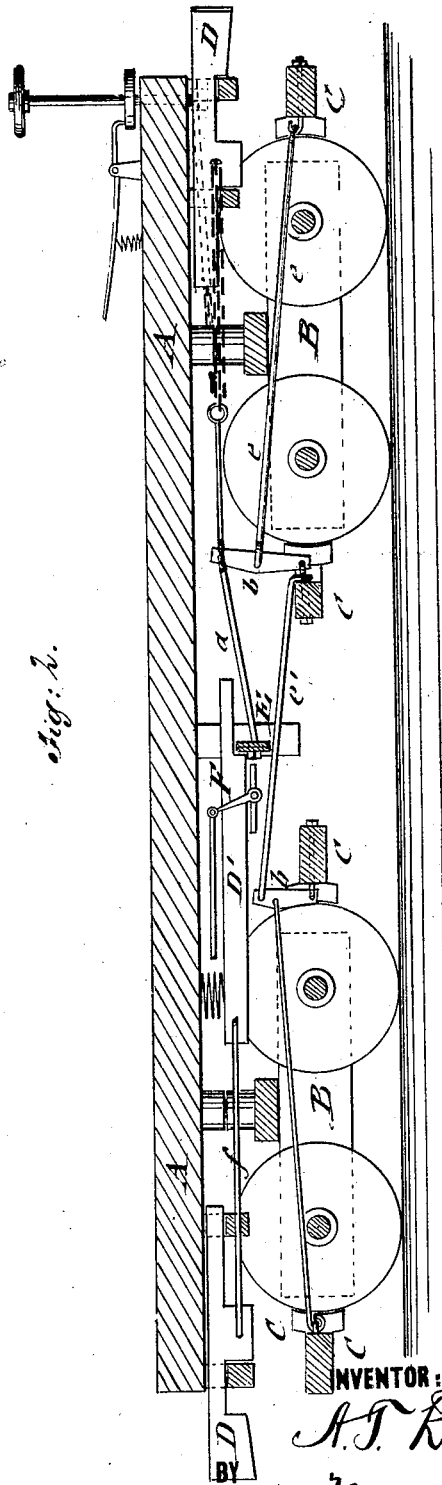
WITNESSES
INVENTOR: A. T. Riley
ATTORNEYS.

UNITED STATES PATENT OFFICE.

ALFRED T. RILEY, OF HALLECK, MISSOURI.

IMPROVEMENT IN CAR-BRAKES.

Specification forming part of Letters Patent No. 166,811, dated August 17, 1875; application filed May 22, 1875.

*To all whom it may concern:*

Be it known that I, ALFRED T. RILEY, of Halleck, in the county of Buchanan and State of Missouri, have invented a new and useful Improvement in Car-Brakes, of which the following is a specification:

In the accompanying drawing, Figure 1 represents a bottom view, and Fig. 2 a vertical longitudinal section, of my improved car-brake, taken on the line *c c*, Fig. 1.

Similar letters of reference indicate corresponding parts.

The invention will first be fully described in connection with drawing, and then pointed out in the claim.

In the drawing, A represents the car-frame; B, the supporting-trucks; C, the brake mechanism applied in the usual manner to the wheels of the same, and D the draw-heads which slide in the customary supports at the bottom of the car-frame.

A lateral band-spring, E, of suitable power, is seated in side-supports near the central bottom part of the car-frame, and connected by a rod, *a*, to the brake-operating lever *b* that is connected by rod and chain *d* to the front draw-head D, and by chain *d* to brake-wheel on the tender or locomotive. Brake-operating rods *e* are pivoted to the lever *b* and to the brake-beams, a rod, *e'*, being extended back to the operating-lever of the corresponding brake mechanism of the rear truck, so that the draw-head or spring controls jointly the operations of the brakes of all the wheels. When the car is in a state of rest, so that no strain is exerted on the spring and front draw-head, the brakes are all, by the action of the spring on the lever and brake-rods, tightly applied to the wheels, but when the cars are coupled and drawn forward the front draw-head slides forward and releases, by the strain on the spring, the brakes, permitting the free and unobstructed turning of the wheels during the forward motion of the train, and the gradual application of the brakes by the spring on the slackening of speed and stopping of the train at stations. Thus an automatically-working brake action is supplied, not by the momentum of the car, as heretofore, but by the mere slackening of speed, and the corresponding action of the brake-controlling spring. The brakes may be permanently released from the wheels by winding up the chain *d* on the brake-wheel of the locomotive until the required tension of the springs is obtained. The release of the brake-wheel produces the instant action of the brakes for stopping of the train, and furnishes thereby a quicker action of the brakes. The rear draw-head D of the car is coupled by a connecting-rod, *f*, with an extension, D', that opens back to the mainspring, and is recessed at the rearmost part to form a shoulder that comes in contact with the spring, while one part extends beyond the same. The extension D' of the draw-head is pivoted and spring-acted in such a manner that it may be thrown in upward position above the spring either by an automatically-working lever and weight device operated by the momentum of the car on being stopped, or directly by a crank-lever and rod, F, operated by treadle from the platform of the car, to slide easily back of the spring without influencing the same. This is the case when the brakes are desired to be applied on the slackening of speed and stoppage of the train. The extension D is, however, allowed to come in contact with the spring when the train is desired to be moved freely in backward direction. The rear draw-head being thereby pushed inward, causes the bending of the spring in the same manner as the strain of the front draw-head during the forward motion of the train, and thereby the release of the brakes and the ready moving of the train.

Having thus described my invention, I claim as new and desire to secure by Letters Patent—

The band-spring E, made fast at each end and about midway of frame A, in combination with brake-lever B connected therewith by rod *a*, as and for the purpose specified.

ALFRED T. RILEY.

Witnesses:
A. M. SAXTON,
R. L. MCDONALD,
JAS. H. RINGO.